(12) United States Patent
Bhogal et al.

(10) Patent No.: US 8,195,035 B2
(45) Date of Patent: Jun. 5, 2012

(54) LINK-BASED DVR SCHEDULING WITH CONFLICT RESOLUTION

(75) Inventors: Kulvir S. Bhogal, Pflugerville, TX (US); Gregory J. Boss, American Fork, UT (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 12/366,721

(22) Filed: Feb. 6, 2009

(65) Prior Publication Data
US 2010/0202754 A1    Aug. 12, 2010

(51) Int. Cl.
*H04N 5/76* (2006.01)
(52) U.S. Cl. .......................... 386/291; 386/292; 386/293
(58) Field of Classification Search .................. 386/200, 386/291, 292, 297
See application file for complete search history.

(56) References Cited

U.S. PATENT DOCUMENTS

| | | | |
|---|---|---|---|
| 5,808,662 A | 9/1998 | Kinney et al. | |
| 7,113,773 B2 | 9/2006 | Quick, Jr. et al. | |
| 7,114,172 B2 | 9/2006 | Lord | |
| 7,246,367 B2 | 7/2007 | Iivonen | |
| 7,669,219 B2 | 2/2010 | Scott, III | |
| 2002/0087661 A1 | 7/2002 | Matichuk et al. | |
| 2003/0016673 A1 | 1/2003 | Pendakur et al. | |
| 2003/0056220 A1 | 3/2003 | Thornton et al. | |
| 2003/0086694 A1 * | 5/2003 | Davidsson | 386/83 |
| 2003/0099462 A1 | 5/2003 | Matsugami | |
| 2003/0121042 A1 | 6/2003 | Franken et al. | |
| 2003/0156827 A1 | 8/2003 | Janevski | |
| 2003/0219228 A1 | 11/2003 | Thiagarajan et al. | |
| 2004/0151474 A1 | 8/2004 | Suh | |
| 2005/0246749 A1 | 11/2005 | Tsuruga et al. | |
| 2006/0026643 A1 | 2/2006 | Silverberg et al. | |
| 2006/0052067 A1 | 3/2006 | Singh et al. | |
| 2006/0062147 A1 | 3/2006 | Dougall et al. | |
| 2006/0174293 A1 | 8/2006 | Ducheneaut et al. | |
| 2006/0288361 A1 | 12/2006 | White Eagle et al. | |
| 2007/0189708 A1 | 8/2007 | Lerman et al. | |
| 2007/0199038 A1 | 8/2007 | Choi | |

(Continued)

FOREIGN PATENT DOCUMENTS

KR    20070030017    3/2007

*Primary Examiner* — Huy T Nguyen (74) *Attorney, Agent, or Firm* — Mitch Harris, Atty at Law, LLC; Andrew M. Harris; Mark C. Vallone (57) ABSTRACT

A method, system and computer program provide a mechanism for scheduling recording of video content by a digital video recorder (DVR) from web links. Scheduling conflicts with previously-scheduled recording are displayed as indicators within the web links, such as a background color of the selectable video program time-slot in a program guide display that differs from the background color(s) user for non-conflicting links. When a user selects a video program link to record, recording of the program is automatically scheduled, and if a conflict exists, recording of the previously-selected conflicting program (or the conflicting portion) is canceled. If more than one DVR is present, and conflicting programs are scheduled for all DVRs, then the user is provided with a prompt to select which previously-scheduled program to cancel. The conflict resolution may be performed at a web service that maintains a database of previous selections, or by a local script/program.

21 Claims, 6 Drawing Sheets

U.S. PATENT DOCUMENTS

| | | |
|---|---|---|
| 2007/0283403 A1 | 12/2007 | Eklund et al. |
| 2008/0010518 A1* | 1/2008 | Jiang et al. .................... 714/21 |
| 2008/0086743 A1 | 4/2008 | Cheng et al. |
| 2008/0189380 A1 | 8/2008 | Bosworth et al. |
| 2008/0313402 A1 | 12/2008 | Wong et al. |
| 2009/0044216 A1 | 2/2009 | McNicoll |
| 2009/0074380 A1 | 3/2009 | Boston et al. |
| 2009/0199013 A1 | 8/2009 | Raciborski |
| 2009/0220216 A1* | 9/2009 | Marsh et al. .................. 386/124 |
| 2009/0263101 A1* | 10/2009 | Rudolph et al. ................ 386/92 |
| 2010/0107104 A1 | 4/2010 | Bruce et al. |
| 2011/0030012 A1* | 2/2011 | Diaz Perez ..................... 725/45 |

* cited by examiner

|   | 41 | 42 | 43 | |
|---|---|---|---|---|
| 7 | Movie: The Fifth Element | | Movie: Sixth Sense | News |
| 8 | Sparks | 60 Minutes | News | Suburban Lawns |
| 10 | Special Update | | Movie: Jaws | News |
| 12 | World according to Elvis | | Soccer: UCLA vs. CalTech | Nova |

|   | 41 | 42 | 43 | |
|---|---|---|---|---|
| 7 | Movie: The Fifth Element | | Movie: Sixth Sense | News |
| 8 | Sparks | 60 Minutes | News | Suburban Lawns |
| 10 | Special Update | | Movie: Jaws | News |
| 12 | World according to Elvis | | CalTech | Nova |

40B 41A, 42A

Un-schedule:

DVR1 : 60 Minutes

DVR2: World Acco

LINK-BASED DVR SCHEDULING WITH CONFLICT RESOLUTION

BACKGROUND OF THE INVENTION

1. Field of the Invention

The present invention is related to consumer digital video recording devices (DVRs), and more particularly to a method and system that schedules DVR recordings in response to user-input provided to a network portal.

2. Description of Related Art

Digital video recorder (DVRs), which may be in the form of a portable device such as a personal video recorder (PVR), a set-top box or a computer having a video interface and/or video capability provided from a digital or analog network source are becoming ubiquitous in households and other locations.

In order to schedule DVR recording over extended time periods and while a DVR operator is not present, traditionally, a recording menu in the DVR or system controlling the DVR is used to program recording time intervals, for example, a week in advance. Remotely controlled recording and DVR management on both local area networks and via the Internet have recently been proposed for web-based and application-based program guide software and portals. However, conflict management is typically performed only when the DVR periodically connects to a service to update its programming guide and a conflict is discovered, or by scheduling using a downloaded program guide that is local to the DVR or a computer system connected to the DVR.

The result is an inconvenience to a DVR user, in that the user may click on links provided by a remote portal, only to discover later that they have selected a program that overlaps a time slot already allocated to record another program. Further, even in systems in which local programming is performed and the DVRs local user interface can immediately inform the DVR user of conflicts, the prevention of conflicts among multiple portals is not provided by such systems. For example, if a DVR user wishes to program a DVR to record broadcast channels, satellite channels and cable channels, present-day systems have no means to accommodate immediate conflict checking amongst those diverse sources, even if web portals were available to select those sources for DVR recording and transmit those selections to the DVR.

Therefore, it would be desirable to provide a method and system that can show a user immediately when conflicts between selected recording periods exist for a given DVR. It would further be desirable to provide conflict checking capability across multiple program selection portals.

BRIEF SUMMARY OF THE INVENTION

The invention is embodied in a method, system and a computer program product. The computer program product may be a server application or a local script or program executed in a browser executed by a general-purpose computer such as a personal computer or a dedicated digital video recording device (DVR). The digital video recording device may be a personal video recorder (PVR), set-top box, personal computer, or any other device that provides recording of video content.

A browser displays a web page that includes one or more links for selecting video programs to schedule for recording on the DVR. The graphical or textual information displayed along with the link provide an indication of whether a conflict with a previously-selected program exists. For example, the background color of a program guide item may be changed if a conflict exists. When a user clicks on a link, the selected program is automatically scheduled for recording and if a conflict exists, the previously-selected program (or the conflicting portion) is un-scheduled. If multiple DVRs are present (or similarly a DVR with multiple tuners is present) and conflicts exist with previously-scheduled programs on all devices, then the user is presented with a prompt to select which previously-scheduled program to cancel.

The functionality can be provided at a web service, which may be a web service provided by the DVR. A computer browser, or a browser implemented within the DVR itself is used to access the web service. Alternatively, the DVR or a computer-based web browser/application may provide a local implementation for conflict-resolution. In web service implementations, a database is maintained of previous recording selections, so that recording conflicts can be flagged at the links pushed from the service. In local implementations, the conflicts can be determined from the existing DVR programming structures, or via a local database. The conflict display indications associated with the links are generated from the locally-stored program information and time/channel information provided from a server for various programs.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to systems and devices that schedule recording for one or more digital video recorders (DVRs). A user interface is provided that indicates potential conflicts between programs that may be selected for recording and previously-scheduled programs in the DVR's recording schedule(s). When a link that specifies a program for recording is activated, the program is automatically selected for recording and the conflicting program (or the conflicting portion thereof) is un-scheduled from recording. If multiple DVRs are present, then the user is presented with a choice of which program/DVR to un-schedule to remove the conflict. The user interface and conflict resolution can be implemented in a local script or application, or can be provided by a web service. If a local script/application implements the user interface, then the program guide or other link arrangement provided by the web service is modified to indicate the conflicts (e.g., by changing the background color of conflicting links) or the local script/application can generate the entire program guide from program data objects provided by the web service.

Figure 1:
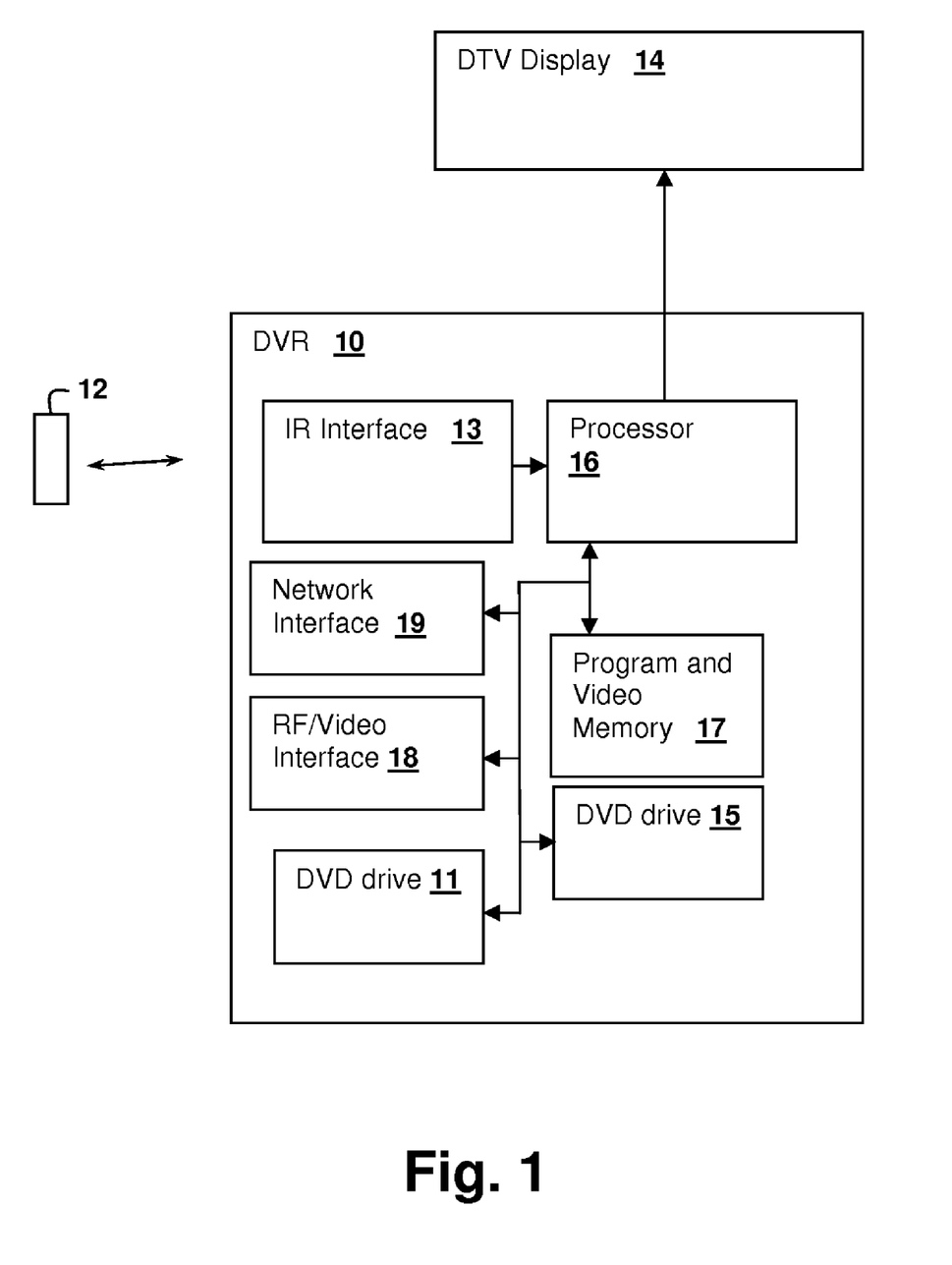
FIG. 1 is a block diagram illustrating a digital video recorder (DVR) in accordance with an embodiment of the present invention.

Referring now to FIG. 1, a digital video recorder (DVR) 10, in accordance with an embodiment of the invention, is shown. DVR 10 is connected to an external digital television (DTV) display 14, but DVR 10 may alternatively be a portable device having an integral display. A remote control 12 is used to control operation of DVR 10, in the exemplary embodiment according to methods of the present invention, in order to provide user input. However, it is understood that other user input methodologies can be employed, such as buttons and other controls integral to DVR 10. DVR 10 includes an infrared (IR) interface 13 for receiving commands from remote control 12, a processor 16 for executing program instructions that implement the user interface and conflict resolution techniques of the present invention, in accordance with methodologies described in further detail below, and also provides control and other functionality as generally associated with DVR operations. The mode of operation for the program in which recording scheduling functions are performed acts as a browser, as links are provided within a user interface for selection of video programs for recording. A program and video memory 17 is coupled to processor 16 for storing data and program instructions, including program instructions in accordance with a computer program product embodiment of the present invention. A radio-frequency (RF)/video interface 18 receives video signals or RF signals from broadcast, closed-circuit or other video streaming sources and provides them for selection by processor 16 for ultimate display by DTV display 14. A network interface 19 provides connection to public or private networks such as the Internet, for receiving additional information such as program guide information for generating the user interface through which recordings are scheduled. A digital versatile disc (DVD) drive 15 and hard disk drive (HDD) 11 are also included in DVR 10 both for recording video program and other information.

Figure 2:
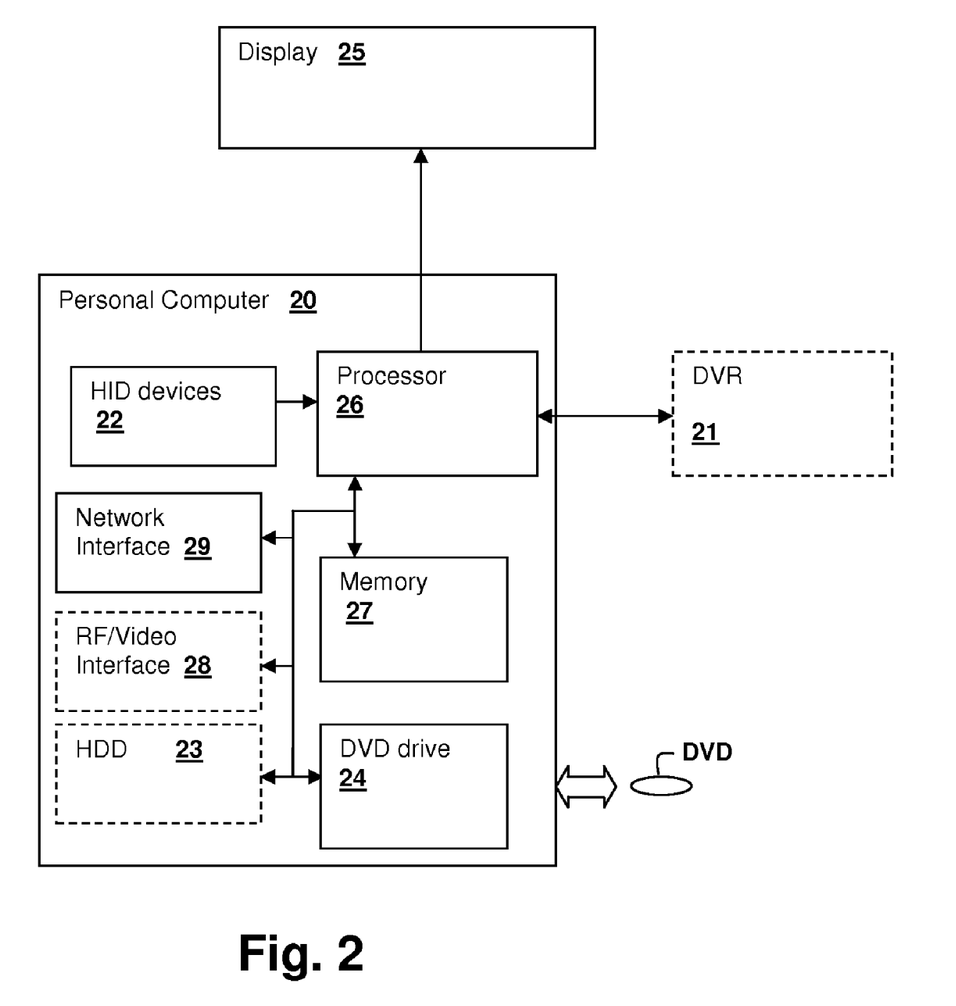
FIG. 2 is a block diagram illustrating a digital video recorder (DVR) in accordance with another embodiment of the present invention.

Referring now to FIG. 2, a DVR in accordance with another embodiment of the invention is illustrated, in the form of a personal computer system. DVR 20 is implemented by personal computer 20, which includes a processor 26 coupled to a memory 27 for storing program instructions including program instructions for implementing a DVR, for example by executing a third-party DVR program. Memory 27 further includes program instructions for carrying out techniques in accordance with the present invention, which may be integrated in such DVR program, or may be provided a stand-alone application, browser plug-in or script that that implement the user interface and conflict resolution techniques of the present invention, in accordance with methodologies described in further detail below, and also provides control and other functionality as generally associated with DVR operations. Personal computer 20 may alternatively, or in combination, control an external DVR 21, either on a real-time basis, or by setting up recording schedules stored within DVR 21. The program performing the scheduling functions serves as a browser, as links are provided within a user interface for selection of video programs for recording. The program may be loaded into memory 27 or HDD 23 from a DVD drive 24 from a data storage media forming a computer program product in accordance with an embodiment of the present invention, such as DVD disc DVD. In order to receive video information from closed-circuit or broadcast sources, personal computer 20 includes an RF/Video interface 28. However, techniques in accordance with an embodiment of the present invention can be performed on video received from a network interface 29 and RF/Video interface 28 is not required in such embodiments. Personal computer 20 also includes a human interface device (HID) interface 22 for connection of HIDs, such as keyboards and pointing devices. Personal computer 20 is also illustrated as connected to an external display 25. However, if personal computer 20 is a laptop, tablet or other integrated device, display 25 will generally be internal to personal computer 20.

Figure 3:
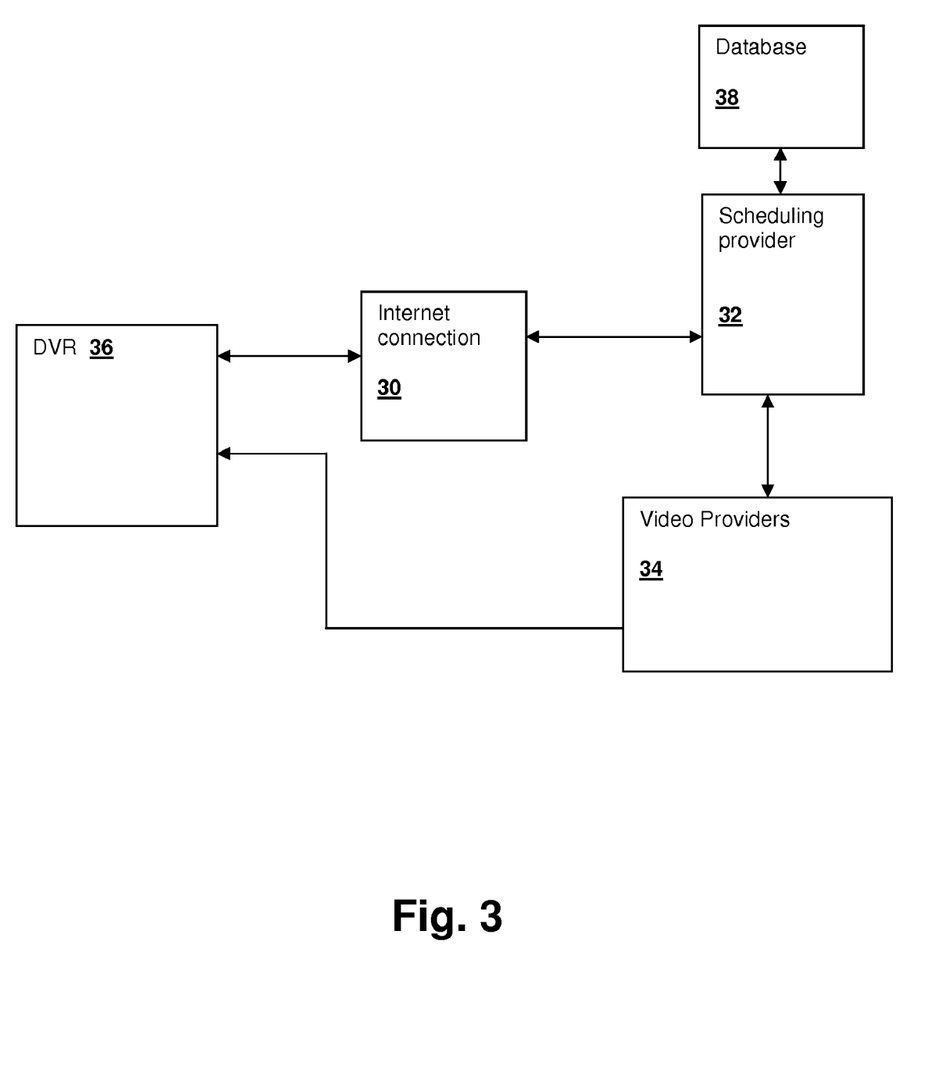
FIG. 3 is a block diagram illustrating a system in accordance with an embodiment of the present invention.

Referring now to FIG. 3, a networked system in accordance with an embodiment of the present invention is shown. A DVR 36, receives signals from one or more broadcast providers 34, through one or more channels as mentioned above, e.g., RF broadcast, satellite broadcast and/or closed-circuit cable. DVR 36 may also receive video information from a generic network data source, such as an Internet connection 30 or other network, which may also be the connection that provides video data from broadcast provider 34, obviating any need for an RF/Video connection. DVR 36 does not require special programming or features other than the capacity to schedule or otherwise control recording of video programs on selected channels in response to communications from the network. DVR 36 can be implemented by a personal computer system similar to that shown in FIG. 2, but again, the capabilities of generating the browser interface of the present invention and performing conflict resolution can be provided remotely and therefore no program other than a browser and an interface for controlling/scheduling DVR recording is required in the local system. To perform conflict resolution and to provide a user interface that shows potential conflicting programs in a program guide or other link arrangement for scheduling recording, a scheduling provider 32 is coupled to DVR 36 via Internet connection 30. Scheduling provider includes a server having a processor, memory and program instructions that generate web pages that reflect the conflicts present with programs previously-selected for recording. The existing recording schedule for DVRs can be stored in and retrieved from a database 38 maintained by scheduling provider 32, and scheduling provider 32 may synchronize recording schedules by retrieving schedules from individual DVRs 36, or an assumption may be made that all scheduling is performed through scheduling provider 32.

Scheduling provider 32 maintains user accounts that link to the information stored in database, and a login may be required to identify a user if a cookie, certificate or other persistent credential is not present in the browser of DVR 36 or a connected computer system. Since scheduling provider 32 already has access to information revealing potential programming conflicts, i.e., the recording schedule of one or more DVRs 36 associated with a user, the program guide web page (or other recording link containing interface) can be pre-populated with indications of conflicts, which may be similar to those described above with respect to DVR 10 of FIG. 1. Records in database 38 indicate how many DVRs 36 are present for each user, and a recording schedule for each DVR 36, so that programs can be scheduled for recording on multiple DVRs and conflicts avoided until the number of programs scheduled for recording at the same time exceeds the available number of DVRs. As mentioned above, under such conditions, the user is presented with an option of which previously-selected program to un-schedule from recording to make room for a newly selected program. It is understood that other techniques and system configurations may be applied in accordance with other embodiments of the present invention and the particular system configuration of FIG. 3 should not be construed as limiting the possible network configurations and end-user appliances that implement techniques in accordance with the present invention as described in further detail below. For example scheduling provider 32 may be a unification service that provides and monitors access to multiple video providers' 34 sites, which may be performed by a toolbar application that updates database 38 remotely, while modifying the recording link web pages locally within the user's computer system or DVR.

Figure 4A:
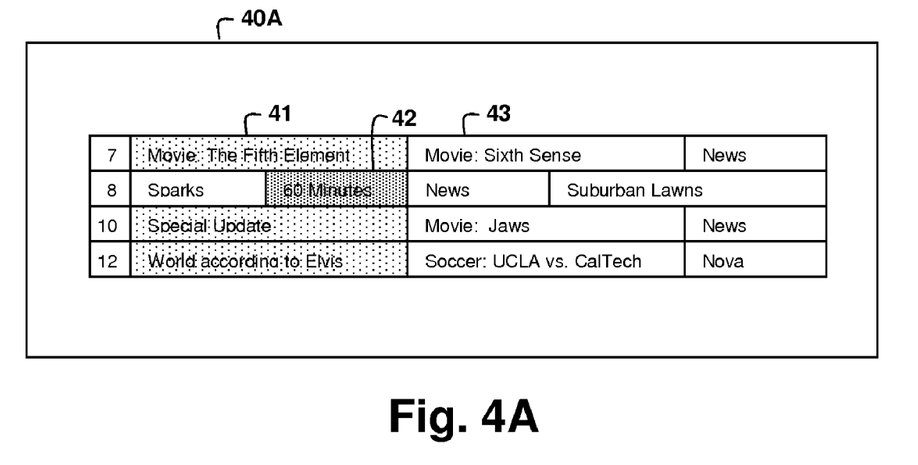
FIGS. 4A and 4B are pictorial diagrams of user interfaces in accordance with embodiments of the present invention.

Referring now to FIG. 4A, a user interface in accordance with an embodiment of the present invention is illustrated, showing a screen that may be presented to a user of DVR 10 of FIG. 1, personal computer 20 of FIG. 2, or DVR 36 of FIG. 3. As noted above, the user interface is generated in a browser by DVR 10 of FIG. 1 or personal computer 20 of FIG. 2 from program/channel/time information provided from a web source, such as a video provider, or the user interface is a web page transmitted from a service such as scheduling provider 32 to a browser. Screen 40A contains a program guide timeline organized by time slots, horizontally, and channel, vertically. Program item 43 illustrates a program link with no conflict with any program previously selected for recording, while program item 42 illustrates a program link previously selected for recording and is displayed with a different background color from that of program item 43. Program item 41, along with other program items having time slots overlapping that of program item 42, is displayed with yet another background color, indicating a conflict with the program associated with program item 42 if selected for recording. If a user selects program item 41, the program associated with program item 42 will be automatically un-scheduled from recording and automatically replaced with the program associated with program item 41.

Figure 4B:
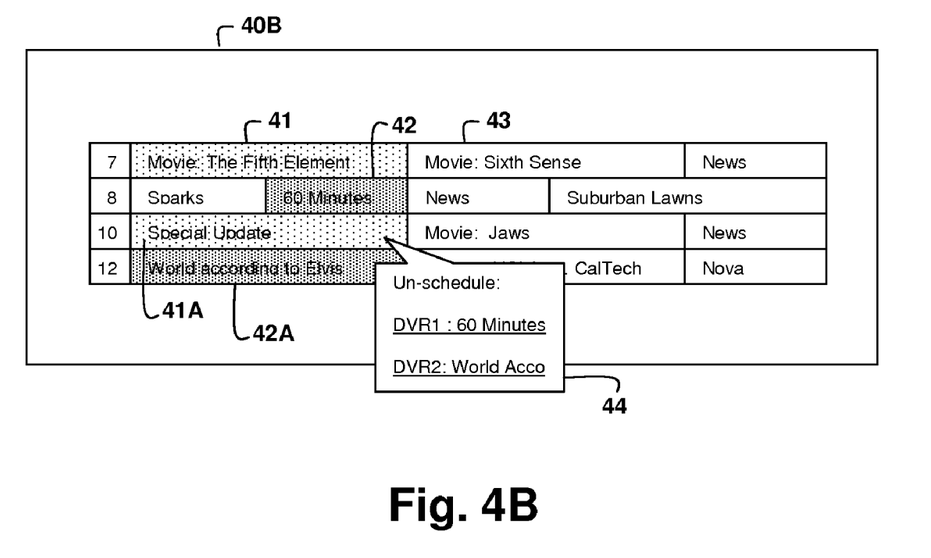

Referring now to FIG. 4B, a user interface in accordance with another embodiment of the present invention is shown, and is compatible with the user interface of FIG. 4A. Therefore both the user interface of FIG. 4A and FIG. 4B may be implemented together. FIG. 4B illustrates a user interface screen 40B in a system having two DVRs available for program recording. Program items 42A and 42 illustrate program links previously selected for recording, one on each DVR. Program items 41 and 41A are displayed with a background color indicating a conflict with the previously-scheduled programs corresponding to program items 42 and 42A. If only one of the programs corresponding to program items 42 or 42A were scheduled for recording, then no conflict would be present and program items 41 and 41A would be displayed with the same background color as program item 43. When a user selects program item 41A for recording, a pop-up 44 menu is generated, requiring the user to select one of two DVRs and/or programs that were previously selected for recording. In response to the user selecting the link for "DVR1: 60 Minutes", then the program associated with program item 42 will be removed from the recording schedule and the program associated with program item 41A will be scheduled for recording on DVR1. In general, if a conflicting program selected overlaps more programs on one DVR than the number of programs it overlaps on the other, the option to cancel the greater number of programs can be displayed further down on the list. If multiple programs must be un-scheduled to make room for a newly-selected item, then each of the programs are displayed in pop-up menu 44, so that the user is properly informed when making the choice.

Figure 5:
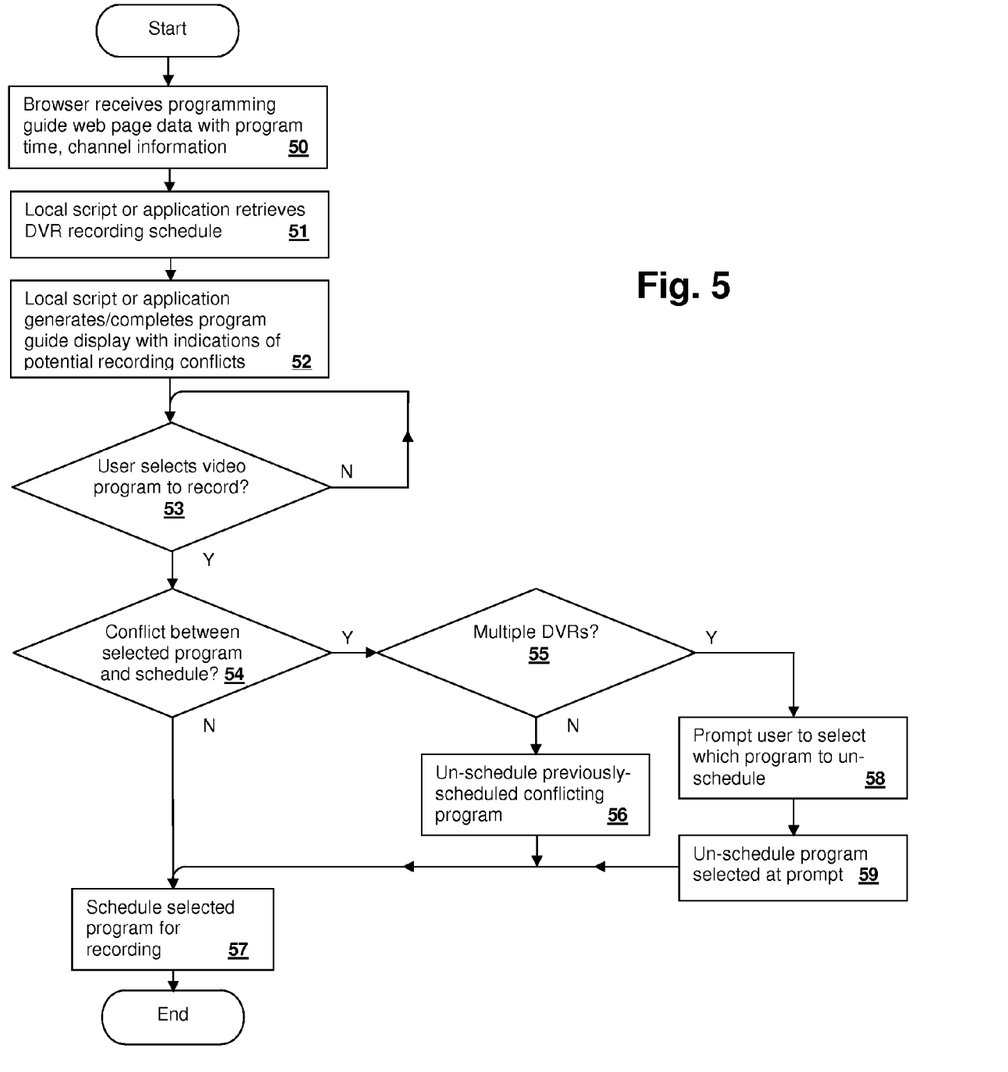
FIG. 5 is a flowchart of a method in accordance with an embodiment of the present invention.

Referring now to FIG. 5, a method according to an embodiment of the present invention is illustrated in a flowchart. The depicted method corresponds to a local program for performing the user interface and conflict resolution techniques as described above, particularly in reference to FIGS. 1 and 2. A browser receives programming guide web page data with program times and channel information (step 50) and the local script or application retrieves the DVR recording schedule (step 51). The local script or application generates or completes (e.g., by changing background colors of link items) the program guide display, including indications of potential recording conflicts (step 52). If a user selects a video program to record (decision 53), then if there is no conflict between the selected program and the recording schedule (decision 54), then the selected program is scheduled for recording (step 57). Otherwise, if a conflict is present (decision 54), if there is only one DVR (decision 55), then the previously-scheduled conflicting program is removed from the schedule (step 56), and the selected program is scheduled for recording (step 57). If there are multiple DVRs available (decision 55), then the user is prompted to select which program to un-schedule (step 58), the program selected at the prompt is un-scheduled (step 59) and the program selected in decision 53 is scheduled for recording (step 57).

Figure 6:
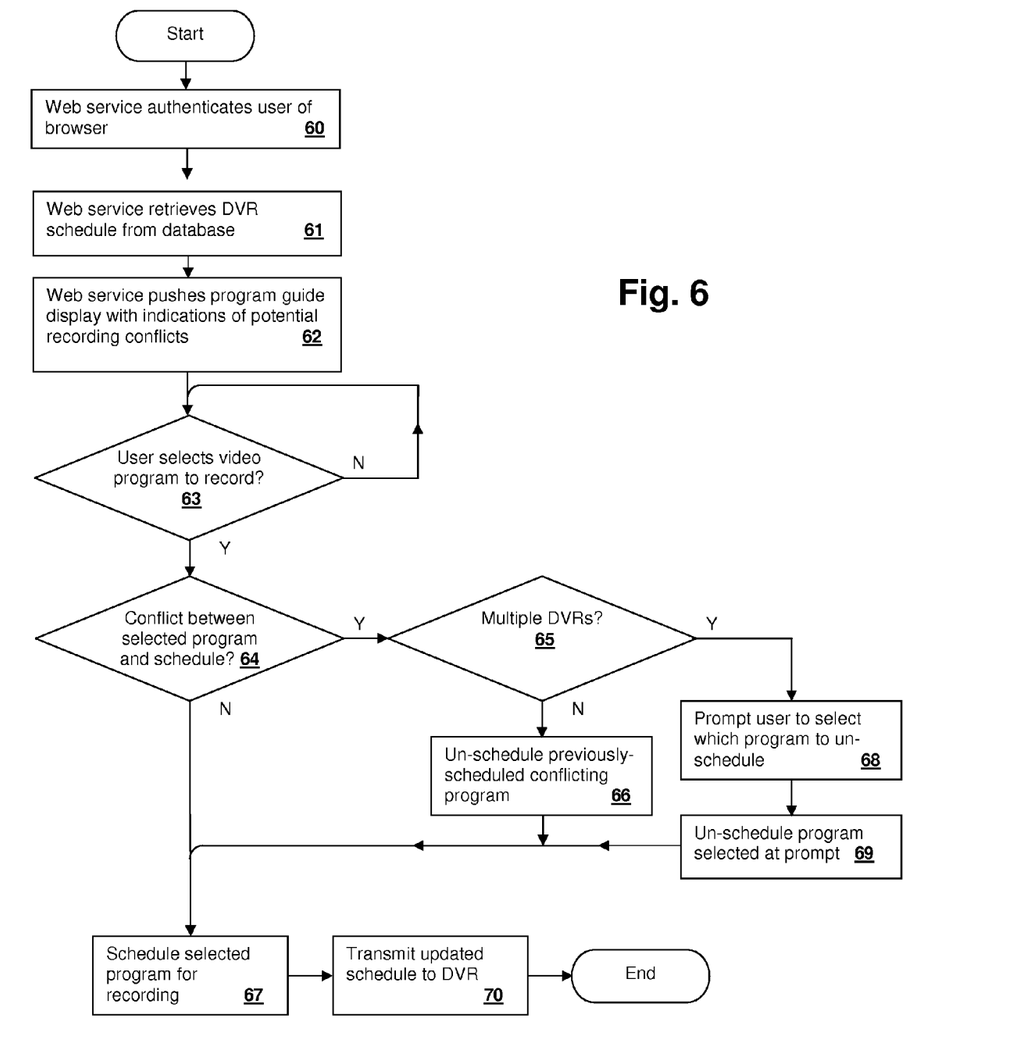
FIG. 6 is a flowchart of a method in accordance with another embodiment of the present invention.

Referring now to FIG. 6, a method according to another embodiment of the present invention is illustrated in a flowchart. The depicted method corresponds to a remote server program for generating the user interface and performing conflict resolution techniques as described above, particularly in reference to FIG. 3. A web service authenticates a user of the browser (step 60) and retrieves the DVR recording schedule from a database (step 61). The web service pushes a program guide including indications of potential recording conflicts (step 62). If a user selects a video program to record (decision 63), then if there is no conflict between the selected program and the recording schedule (decision 64), then the selected program is scheduled for recording (step 67) and the updated schedule is transmitted to the DVR (step 70). Otherwise, if a conflict is present (decision 64), if there is only one DVR (decision 65), then the previously-scheduled conflicting program is removed from the schedule (step 66), the selected program is scheduled for recording (step 67) and the updated schedule is transmitted to the DVR (step 70). If there are multiple DVRs associated with the user (decision 65), then the user is prompted to select which program to un-schedule (step 68), the program selected at the prompt is un-scheduled (step 69), the program selected in decision 63 is scheduled for recording (step 67) and the updated schedule is transmitted to the DVR (step 70).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of scheduling programming of video recording for at least one digital video recording device, the method comprising:

providing one or more user-selectable links within a browser executing within a computer, wherein the one or more user-selectable links are for selecting one or more video programs for scheduling recording on the at least one digital video recording device, and wherein an indication within a textual or graphical information item associated and displayed with a user-selectable link of the one or more user-selectable links indicates whether or not a conflict exists between a time slot of a first video program that is associated with the user-selectable link and that is not scheduled for recording on the at least one digital video recording device and a time slot of a second video program that is scheduled for recording on the at least one digital video recording device;

responsive to receiving a user selection of the user-selectable link, programmatically determining whether the conflict exists between the time slot of the first video program that is associated with the user-selectable link and the time slot of the second video program;

responsive to determining that the conflict exists between the time slot of the first video program and the time slot of the second video program, automatically un-scheduling recording of at least a portion of the second video program; and further responsive to receiving the user selection of the user-selectable link, automatically scheduling the first video program for recording.

2. The method of claim 1, wherein the information item is a color of at least a portion of a rectangular time slot box within a table displaying video programs organized by rows corresponding to channels and columns corresponding to time-slots, wherein rectangular time slot boxes corresponding to the user-selectable lines are displayed using a first background color if no conflict exists with a time slot of any program already scheduled for recording and using a second background color otherwise.

3. The method of claim 1, further comprising:
receiving the one or more user-selectable links from a server as one or more objects further providing start time, stop time or duration, and channel information; and
a local script or program executing within the browser generating the indication that indicates whether or not the conflict exists in a display of the browser;
wherein the determining whether the conflict exists is performed by the local script or program executing within the browser.

4. The method of claim 3, wherein the browser is provided by a selectable operating mode of the at least one digital video recording device, wherein the computer is the at least one digital video recording device, and wherein the local script or program is executed by a processor within the at least one digital video recording device.

5. The method of claim 1, wherein the computer is a first computer, wherein the one or more user-selectable links are provided by a web service as one or more graphical elements within a web page, wherein the method further comprises:
a second computer maintaining a database of prior selections of video programs for scheduling recording by digital video recording devices associated with a plurality of accounts, wherein the at least one digital video recording device is at least one of the digital video recording devices;
the second computer identifying an account corresponding to the browser;
the second computer retrieving the prior selections from the database;
the second computer transmitting the web page to the browser executing within the first computer including the one or more graphical elements, wherein the one or more graphical elements provide the indication of whether or not the conflict exists, and wherein the second computer determines whether the conflict exists between the time slot of the first video program and the time slot of the second video program; and
the second computer updating the database and transmitting a message to the browser executing within the first computer or the at least one digital video recording device to un-schedule the at least a portion of the second video program.

6. The method of claim 5, wherein the at least one digital video recording device comprises multiple digital video recording devices, wherein the database contains an element for each account specifying a number of the multiple digital video recording devices associated with the account, wherein the method further comprises:
the second computer determining that a number of conflicts exist between the time slot of the first video program and time slots of a number of multiple previously-selected video programs equal to the number of multiple digital video recording devices associated with the account, wherein the determining that the number of conflicts exists includes the determining whether the conflict exists;
the first computer displaying within the browser a prompt to select which of the multiple previously-selected video programs to automatically un-schedule; and
the second computer receiving a response from the browser to the prompt indicating a selected one of the multiple previously-selected video programs selected as the second video program, and wherein the automatically un-scheduling comprises un-scheduling at least a portion of the selected one of the multiple previously-selected video programs.

7. The method of claim 1, wherein the at least one digital video recording device comprises multiple digital video recording devices, wherein the method further comprises:
determining that all of the multiple digital video recording devices are scheduled to record multiple previously-selected video programs have time slots that conflict with the first video program;
displaying within the browser a prompt to select which of the multiple previously-selected video programs to automatically un-schedule as the second video program; and
receiving a response from the browser to the prompt indicating a selected one of the multiple previously-selected video programs, and wherein the automatically un-scheduling comprises un-scheduling at least a portion of the selected one or the multiple previously-selected video programs.

8. A system for recording digital video, the system comprising:
at least one processor for executing program instructions;
at least one computer readable storage device, each one of the at least one computer readable storage device being coupled to a corresponding one of the at least one processor;
program instructions, stored on at least one of the at least one storage device for execution by at least one of the at least one processor, to provide one or more user-selectable links within a browser for selecting video programs for recording, wherein an indication within a textual or graphical information item associated and displayed with a user selectable link of the one or more user-selectable links indicates whether or not a conflict exists between a time slot of a first video program that is associated with the user-selectable link and that is not scheduled for recording on the at least one digital video recording device and a time slot of a second video program that is scheduled for recording on the at least one digital video recording device;
program instructions, stored on at least one of the at least one storage device for execution by at least one of the at least one processor, to, responsive to receiving a user selection of the user-selectable link, determine whether the conflict exists between the time slot of the first video program and the time slot of the second video program;

program instructions, stored on at least one of the at least one storage device for execution by at least one of the at least one processor, to, responsive to determining that the conflict exists between the time slot of the first video program and the time slot of the second video program, automatically un-schedule recording of at least a portion of the second video program; and program instructions, stored on at least one of the at least one storage device for execution by at least one of the at least one processor, to, further responsive to receiving the user selection of the user-selectable link, automatically schedule the first video program for recording.

9. The system of claim 8, wherein the information item is a color of at least a portion of a rectangular time slot box within a table displaying video programs organized by rows corresponding to channels and columns corresponding to timeslots, wherein rectangular time slot boxes corresponding to the user-selectable lines are displayed using a first background color if no conflict exists with a time slot of any program already scheduled for recording and using a second background color otherwise.

10. The system of claim 8, wherein the at least one processor includes a server processor and a local processor and the at least one memory includes a server memory coupled to the server processor and a local memory coupled to the local processor, wherein the at least one storage device includes a server storage device coupled to the server processor and a local storage device coupled to the local processor, wherein the local processor executes local program instructions implementing the browser, and wherein the system further comprises:

local program instructions, stored on the local storage device for execution by the local processor, to, receive the one or more user-selectable links from the server processor as one or more objects further providing start time, stop time or duration, and channel information; and a local script or program executing within the browser by the local processor to generate the indication that indicates whether or not the conflict exists in a display of the browser, wherein the program instructions to determine whether the conflict exists are program instructions of the local script or program executing within the browser.

11. The system of claim 10, wherein the local processor and local storage device are located within the at least one digital video recording device, wherein the browser is a browser provided by a selectable operating mode of the at least one digital video recording device and executed by the local processor, and wherein the local script or program is executed by the local processor within the at least one digital video recording device.

12. The system of claim 8, wherein the at least one processor includes a server processor and a local processor and the at least one storage device includes a local storage device coupled to the local processor and a server storage device coupled to the server processor, wherein the program instructions are server program instructions for execution by the server processor, wherein the local processor executes local program instructions implementing the browser, wherein the one or more user-selectable links are provided by a web service as one or more graphical elements within a web page transmitted from the server processor to the local processor, and wherein the system further comprises:

server program instructions, stored on the server storage device for execution by the server processor, to maintain a database of prior selections of video programs for recording by digital video recording devices associated with a plurality of accounts, wherein the at least one digital video recording device is at least one of the digital video recording devices;

server program instructions, stored on the server storage device for execution by the server processor, to identify an account corresponding to the browser;

server program instructions, stored on the server storage device for execution by the server processor, to retrieve the prior selections from the database; and server program instructions, stored on the server storage device for execution by the server processor, to transmit the web page to the browser including the one or more graphical elements, wherein the one or more graphical elements provide the indication of whether or not the conflict exists, and wherein the server processor determines whether the conflict exists between the time slot of the first video program and the time slot of the second video program; and server program instructions, stored on the server storage device for execution by the server processor, to update the database and transmit a message to the browser or the at least one digital video recording device to un-schedule the at least a portion of the second video program.

13. The system of claim 12, wherein the at least one digital video recording device comprises multiple digital video recording devices, wherein the database contains an element for each account specifying a number of the multiple digital video recording devices associated with the account, wherein the system further comprises:

server program instructions, stored on the server storage device for execution by the server processor, to determine that a number of conflicts exist between the time slot of the first video program and time slots of a number of multiple previously-selected video programs equal to the number of multiple digital video recording devices associated with the account, wherein the program instructions to determine that a number of conflicts exist include the program instructions to determine whether the conflict exists;

server program instructions, stored on the server storage device for execution by the server processor, to transmit to the browser a prompt to select which of the multiple previously-selected video programs to automatically un-schedule; and server program instructions, stored on the server storage device for execution by the server processor, to receive a response from the browser to the prompt indicating a selected one of the multiple previously-selected video programs selected as the second video program, and wherein the program instructions to automatically un-schedule at least a portion of the selected one of the multiple previously-selected video programs.

14. The system of claim 8, wherein the at least one digital video recording device comprises multiple digital video recording devices, wherein the system further comprises:

program instructions, stored on at least one of the at least one storage device for execution by at least one of the at least one processor, to determine that all of the multiple digital video recording devices are scheduled to record multiple previously-selected video programs have time slots that conflict with the first video program;

program instructions, stored on at least one of the at least one storage device for execution by at least one of the at least one processor, to display within the browser, a prompt to select which of the multiple previously-selected video programs to automatically un-schedule as the second video program; and program instructions, stored on at least one of the at least one storage device for execution by at least one of the at least one processor, to receive a response from the browser to the prompt indicating a selected one of the multiple previously-selected video programs, and wherein the program instructions to automatically un schedule the at least a portion of the second video program automatically un-schedule at least a portion of the selected one or the multiple previously-selected video programs.

15. A computer program product for scheduling video program recording for at least one digital video recording device, the computer program product comprising a computer-readable storage device having a plurality of program instructions stored therein for execution by a processor of a computer system, the plurality of program instructions comprising:

program instructions for providing one or more user-selectable links within a browser, wherein the one or more user-selectable links are for selecting one or more video programs for scheduling recording on the at least one digital video recording device, and wherein an indication within a textual or graphical information item associated and displayed with a user-selectable link of the one or more user-selectable links indicates whether or not a conflict exists between a first time slot of a first video program that is associated with the user-selectable link and that is not scheduled for recording on the at least one digital video recording device and a time slot of a second video program that is scheduled for recording on by the at least one digital video recording device;

program instructions for, responsive to receiving a user selection of the user-selectable link, determining whether the conflict exists between the time slot of the first video program and the time slot of the second video program;

program instructions for, responsive to determining that the conflict exists between the time slot of the first video program and the time slot of the second video program, automatically un-scheduling recording of at least a portion of the second video program; and program instructions for, further responsive to receiving the user selection of the user-selectable link, automatically scheduling the first video program for recording.

16. The computer program product of claim 15, wherein the information item is a color of at least a portion of a rectangular time slot box within a table displaying video programs organized by rows corresponding to channels and columns corresponding to time-slots, wherein rectangular time slot boxes corresponding to the user-selectable lines are displayed using a first background color if no conflict exists with a time slot of any program already scheduled for recording and using a second background color otherwise.

17. The computer program product of claim 15, wherein the plurality of program instructions further comprise:

program instructions for receiving the one or more user-selectable links as one or more objects further providing start time, stop time or duration, and channel information and program instructions of a local script or program for execution within the browser to generate the indication of whether the conflict exists and, wherein the program instructions for determining whether or not the conflict exists are program instructions of the local script or program.

18. The computer program product of claim 17, wherein the browser is a browser provided by a selectable operating mode of the at least one digital video recording device.

19. The computer program product of claim 15, wherein the processor is a server processor coupled to the browser via a network, wherein the one or more user-selectable links are provided by a web service as one or more graphical elements within a web page transmitted from the server processor to the browser, wherein the plurality of program instructions further comprise:

program instructions for maintaining a database of prior selections of video programs for recording by digital video recording devices associated with a plurality of accounts, wherein the at least one digital video recording device is at least one of the digital video recording devices;

program instructions for identifying an account corresponding to the browser;

program instructions for retrieving the prior selections from the database; and program instructions for transmitting the web page to the browser including the one or more graphical elements, wherein the one or more graphical elements provide the indication of whether or not the conflict exists; and program instructions for updating the database and transmitting a message to the browser or the at least one digital video recording device to un-schedule the at least a portion of the second video program.

20. The computer program product of claim 19, wherein the at least one digital video recording device comprises multiple digital video recording devices, wherein the database contains an element for each account specifying a number of the multiple digital video recording devices associated with the account, and wherein the plurality of program instructions further comprise:

program instructions for determining that a number of conflicts exist between the time slot of the first video program and time slots of a number of multiple previously-selected video programs equal to the number of multiple digital video recording devices associated with the account, wherein the program instructions to determine that the number of conflicts exist include the program instructions for determining whether the conflict exists;

program instructions for transmitting to the browser, a prompt to select which of the multiple previously-selected video programs to automatically un-schedule; and program instructions for receiving a response from the browser to the prompt indicating a selected one of the multiple previously-selected video programs, and wherein the program instructions for automatically un-scheduling automatically un-schedule at least a portion of the selected one of the multiple previously-selected video programs.

21. The computer program product of claim 15, wherein the at least one digital video recording device comprises multiple digital video recording devices, wherein the plurality of program instructions further comprise:

program instructions for determining that all of the multiple digital video recording devices are scheduled to record multiple previously-selected video programs have time slots that conflict with the first video program;

program instructions for displaying within the browser, a prompt to select which of the multiple previously-selected video programs to automatically un-schedule as the second video program; and program instructions for receiving a response from the browser to the prompt indicating a selected one of the multiple previously-selected video programs, and wherein the program instructions to automatically un-schedule the at least a portion of the second video program automatically un-schedule at least a portion of the selected one or the multiple previously-selected video programs.

* * * * *